(12) United States Patent
Fujita et al.

(10) Patent No.: US 7,326,281 B2
(45) Date of Patent: Feb. 5, 2008

(54) HYDROGEN STORAGE TANK

(75) Inventors: Katsuyoshi Fujita, Kariya (JP); Hidehito Kubo, Kariya (JP); Masahiko Kimbara, Kariya (JP); Daigoro Mori, Mishima (JP)

(73) Assignees: Kabushiki Kaisha Toyota Jidoshokki, Kariya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 338 days.

(21) Appl. No.: 11/064,620

(22) Filed: Feb. 24, 2005

(65) Prior Publication Data

US 2005/0188847 A1  Sep. 1, 2005

(30) Foreign Application Priority Data

Feb. 27, 2004  (JP)  ............... 2004-055234

(51) Int. Cl.
*F17C 11/00* (2006.01)
*F25B 17/12* (2006.01)

(52) U.S. Cl. .................... 96/108; 96/146; 206/0.7

(58) Field of Classification Search ............... 96/108, 96/146, 152, 154; 206/0.7; 420/900; 502/526; 220/581, 586
See application file for complete search history.

(56) References Cited

U.S. PATENT DOCUMENTS

| | | | | |
|---|---|---|---|---|
| 4,457,136 A | * | 7/1984 | Nishizaki et al. ............ 62/46.2 |
| 4,598,836 A | * | 7/1986 | Wessel ..................... 206/0.7 |
| 4,667,815 A | * | 5/1987 | Halene ..................... 206/0.7 |
| 5,082,048 A | * | 1/1992 | Iwaki et al. ............ 165/104.12 |
| 5,445,099 A | * | 8/1995 | Rendina ..................... 114/140 |
| 6,267,229 B1 | * | 7/2001 | Heung ..................... 206/0.7 |
| 6,604,573 B2 | * | 8/2003 | Morishima et al. ......... 165/153 |
| 7,169,214 B2 | * | 1/2007 | Kubo et al. .................. 96/108 |
| 2002/0100369 A1 | * | 8/2002 | Kuriiwa et al. .............. 96/146 |
| 2003/0209149 A1 | * | 11/2003 | Myasnikov et al. .......... 96/146 |
| 2005/0000970 A1 | * | 1/2005 | Kimbara et al. ............ 220/581 |
| 2005/0051294 A1 | * | 3/2005 | Fujita et al. .................. 165/10 |
| 2006/0065553 A1 | * | 3/2006 | Golben ..................... 206/0.7 |

FOREIGN PATENT DOCUMENTS

| | | |
|---|---|---|
| JP | 11-43301 | 2/1999 |
| JP | 2000-111193 | 4/2000 |
| JP | 2001-10801 | 1/2001 |
| JP | 2003-120898 | 4/2003 |

\* cited by examiner

*Primary Examiner*—Frank M. Lawrence
(74) *Attorney, Agent, or Firm*—Morgan & Finnegan, L.L.P.

(57) ABSTRACT

A tank main body accommodates a heat exchanger including a heating medium pipe. A plurality of heat exchanger fins are coupled to the heating medium pipe to divide the interior of the tank main body into a plurality of spaces. A hydrogen storage alloy is provided in the spaces. An absorption portion is provided in the spaces. The absorption portion is deformed by a force generated by expansion of the hydrogen storage alloy, thereby absorbing the force. Therefore, the heat exchanger is prevented from being deformed or damaged even if the bulk density of the hydrogen storage alloy is reduced due to expansion and pulverization of the hydrogen storage alloy.

16 Claims, 3 Drawing Sheets

HYDROGEN STORAGE TANK

BACKGROUND OF THE INVENTION

The present invention relates to a hydrogen storage tank, and more specifically to a hydrogen storage tank that accommodates a hydrogen storage alloy and a heat exchanger.

In recent years, awareness of suppressing global warming has been raised. Particularly, development of fuel cell cars and hydrogen engine cars has been promoted to reduce carbon dioxide emitted from vehicles. In a fuel cell car, hydrogen and oxygen are electrochemically reacted with each other to generate electricity. The generated electricity is supplied to a motor to generate driving force. As a method for supplying hydrogen, there is known a technique in which a hydrogen storage alloy is accommodated in a tank, which alloy stores and releases hydrogen to be utilized. A hydrogen storage alloy generates heat when storing hydrogen and absorbs heat when releasing hydrogen. It is therefore common to provide a heat exchanger in a tank accommodating a hydrogen storage alloy to promote storage and release of hydrogen. For example, a heat exchanger having heating medium tubes through which a heating medium flows and comb-like fins provided on the circumference of the tubes is used. Instead of heating medium tubes, some heat exchangers have corrugated plates and flat plates that are combined to form passage for a heating medium (for example, Japanese Laid-Open Patent Publication No. 2000-111193).

Incidentally, a hydrogen storage alloy is used in the powder form. Also, a hydrogen storage alloy has a property to be inflated when storing oxygen. Hydrogen storage alloy powder may be settled and compacted in the tank. When hydrogen is stored by such compacted hydrogen storage alloy powder, the alloy powder is expanded, which locally generates an excessive stress. This can adversely affects the tank main body and the heat exchanger in the tank. As measures against such drawbacks, sheet-like members are provided between fin tubes forming a heat exchanger, for example, in Japanese Laid-Open Patent Publication No. 11-43301, to prevent hydrogen storage alloy powder from sedimenting. Also, Japanese Laid-Open Patent Publication No. 2001-10801 discloses a structure in which heating medium tubes having an oblong cross-section prevent hydrogen storage alloy from sedimenting.

Also, Japanese Laid-Open Patent Publication No. 2003-120898 discloses a metal hydride containing device in which containers each containing a predetermined amount of metal hydride are stacked in a main body of the device. The device is configured to have spaces to allow the metal hydride to expand when storing hydrogen.

However, although the technique disclosed in the publication No. 11-43301, which has sheet-like members between fin tubes, prevents hydrogen storage alloy powder from sedimenting, a space for accommodating the sheet-like members must be saved in the tank main body. Accordingly, the space for accommodating hydrogen storage alloy powder and the heat exchanger is reduced. Also, since the fin tubes and heat exchanger fins are arranged along a cross-sectional direction perpendicular to the longitudinal direction of the tank main body, heat exchanger fins not contact the hydrogen storage alloy powder in many sections. In this manner, although the technique disclosed in the publication No. 11-43301 is capable of preventing hydrogen storage alloy powder from sedimenting in a tank, the heat exchanging performance between the hydrogen storage alloy powder and the heat exchanger is degraded.

On the other hand, according to the technique disclosed in the publication No. 2001-10801, the drawbacks of the publication No. 11-43301 may be eliminated by preventing a hydrogen storage alloy from sedimenting by using the heating medium tubes. However, since the tubes have curved sections, the tubes have the limits in terms of prevention of hydrogen storage alloy sediment. The method of the publication No. 2001-10801 is therefore hardly reliable.

In Japanese Laid-Open Patent Publications No. 2000-111193, No. 11-43301, and No. 2001-10801, increasing the amount of hydrogen storage alloy powder filling spaces between fins causes the powder to be pulverized when storage and release of hydrogen are repeated. Accordingly, the bulk density of the powder is reduced. In such a case, the heat exchanger can be deformed or damaged if excessive pressure in a direction perpendicular to the fins is applied. None of the publications discloses measures against such a drawback.

On the other hand, a storage container disclosed in Japanese Laid-Open Patent Publication No. 2003-120898 is designed in consideration of expansion of metal hydride when storing hydrogen into the metal hydride. However, the publication has no mention of reduction of the bulk density due to pulverization.

SUMMARY OF THE INVENTION

Accordingly, it is an objective of the present invention to provide a hydrogen storage tank that prevents a heat exchanger from being deformed or damaged even if the bulk density of a hydrogen storage alloy is reduced due to expansion and pulverization of the hydrogen storage alloy.

To achieve the above-mentioned objective, the present invention provides a hydrogen storage tank. The tank includes a tank main body and a hydrogen storage alloy accommodated in the tank main body. The hydrogen storage alloy expands when storing hydrogen. A heat exchanger is accommodated in the tank main body. The heat exchanger includes a heating medium pipe, through which a heating medium flows. A plurality of heat exchanger fins are coupled to the heating medium pipe to divide the interior of the tank main body into a plurality of spaces. The hydrogen storage alloy is provided in the spaces. An absorption portion is provided in the spaces. The absorption portion is deformed by a force generated by expansion of the hydrogen storage alloy, thereby absorbing the force.

Further, the present invention provides a hydrogen storage tank. The tank includes a tank main body. A hydrogen storage alloy is accommodated in the tank main body. The hydrogen storage alloy expands when storing hydrogen. A heat exchanger is accommodated in the tank main body. The heat exchanger includes a plurality of heat exchanger fins that divide the interior of the tank main body into a plurality of sections. The sections include filled sections that are filled with the hydrogen storage alloy, and non-filled sections that are not filled with the hydrogen storage alloy. Each of the non-filled sections functioning as an absorption portion. The absorption portion is deformed by a force generated by expansion of the hydrogen storage alloy, thereby absorbing the force.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
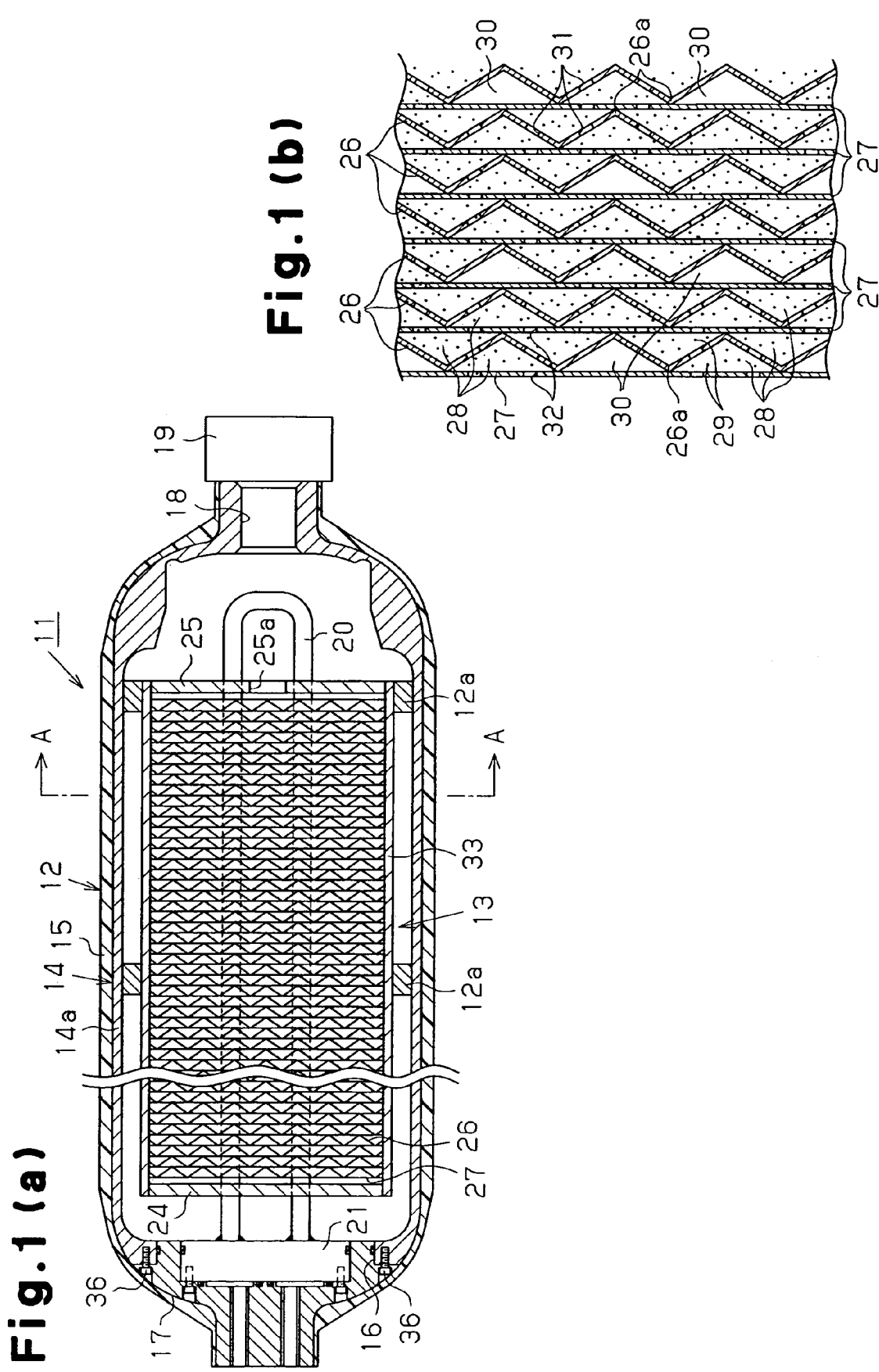
FIG. 1(a) is a cross-sectional view illustrating a hydrogen storage tank according to a first embodiment of the present invention.
FIG. 1(b) is a partially enlarged view showing the tank of FIG. 1(a)

A hydrogen storage tank 11 according to a first embodiment of the present invention will now be described referring to FIGS. 1(a) to 3. FIG. 1(a) shows the orientation of the hydrogen storage tank 11 in use. That is, the vertical direction in the drawing corresponds to the vertical direction of the tank 11 in use.

As shown in FIG. 1(a), the hydrogen storage tank 11 includes a tubular (in this embodiment, cylindrical) tank main body 12 and a heat exchanger 13. The heat exchanger 13 is accommodated in the tank main body 12. The tank main body 12 includes an elongated hollow liner 14 and a fiber reinforced resin layer 15 that covers the substantially entire outer surface of the liner 14. The liner 14 is made, for example, of an aluminum alloy and makes the tank 11 hermetic. The left end (proximal end) of the liner 14 is formed of separate components. The liner 14 has a substantially tubular liner body 14a, and a lid 17 that closes an opening 16 at the proximal end of the liner body 14a. An opening 18 is provided at the right end (distal end) of the liner 14. The opening 18 functions as a gas passage for drawing and discharging hydrogen.

A valve 19 is attached to the opening 18. The ports of the valve 19 are switched for switching the state of the hydrogen storage tank 11 between a hydrogen release state and a hydrogen storage state. The hydrogen release state refers to a state where hydrogen in the tank 11 is released to the outside through the valve 19, and supply of hydrogen into the tank 11 is prohibited. The hydrogen storage state refers to a state where hydrogen in the tank 11 cannot be released to the outside through the valve 19, and supply of hydrogen into the tank 11 is permitted. A seal ring (not shown) is provided between the valve 19 and an end face of the liner 14.

In this embodiment, the fiber reinforced resin layer 15 is formed of carbon fiber reinforced plastics (CFRP), which include carbon fibers as reinforcing fibers. The fiber reinforced resin layer 15 increases the pressure resistance (mechanical strength) of the hydrogen storage tank 11. The fiber reinforced resin layer 15 is formed in the following manner.

First, carbon fiber bundles impregnated with resin (for example, unsaturated polyester resin or epoxy resin) is wound around the liner 14 such that the fiber bundles form helically wound layers and hoop wounded layers. Then, the resin is hardened with heat.

The heat exchanger 13 is attached to the lid 17. The heat exchanger 13 includes a pair of U-shaped heating medium pipes 20 that extend in the longitudinal direction of the hydrogen storage tank 11 (in the lateral direction as viewed in FIG. 1(a)) and a substantially disk-shaped header portion 21. The heating medium pipes 20 permit a heating medium to flow through. The heat exchanger 13 is attached to the lid 17 at the header portion 21. Ends of the heating medium pipes 20 are fixed to the header portion 21 by soldering or welding.

Figure 2:
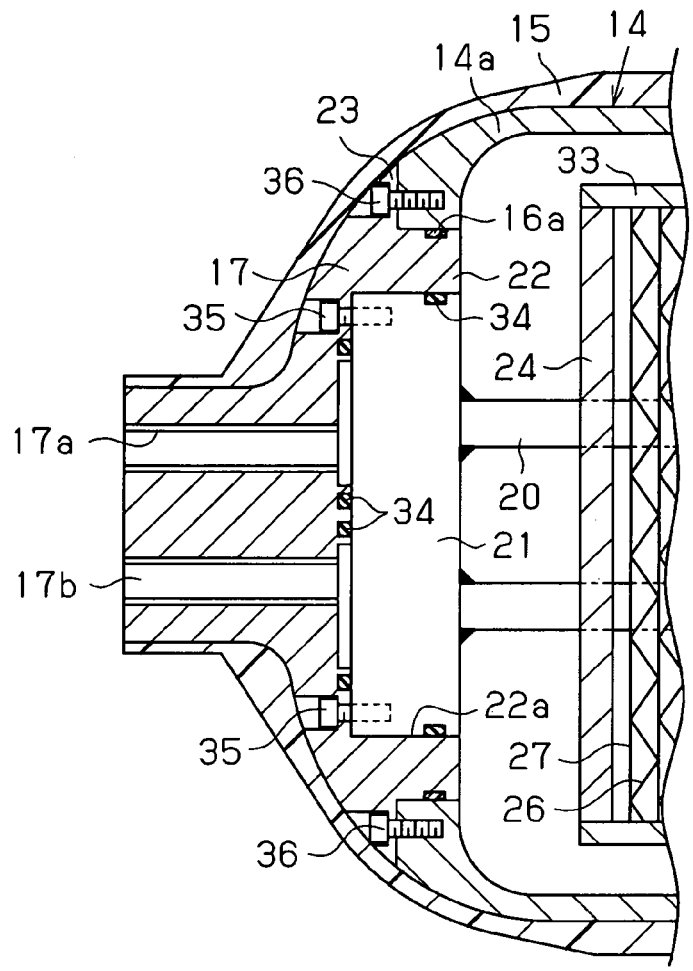
FIG. 2 is a partially enlarged view showing the tank of FIG. 1(a)

As shown in FIG. 2, the lid 17 has a cylindrical projection 22 and a flange 23. The projection 22 is fitted to the opening 16. The flange 23 has a larger diameter than the projection 22. A seal ring 16a is provided between the outer circumferential surface of the projection 22 and the inner circumferential surface of the opening 16. The seal ring 16a maintains the sealing property (hermeticity) between the liner body 14a and the lid 17. The lid 17 has a recess 22a and passages 17a and 17b. The recess 22a opens at the end face of the projection 22 and receives the header portion 21. The passages 17a and 17b communicate with the recess 22a. The passages 17a, 17b are connected to pipes communicating with a heating medium supplier (not shown), so that the heating medium pipes 20 receive the heating medium, which is water (cold or heated). In this embodiment, the passage 17a is on the upstream side of the heating medium, and the passage 17b is on the downstream side of the heating medium. The passages 17a, 17b are each connected to ends of the heating medium pipes 20 through passages formed in the header portion 21.

As shown in FIG. 1(a), substantially disk-shaped end plates 24, 25 are fixed to the heating medium pipes 20. A threaded hole 25a is formed in a center of the end plate 25 that is located at the distal end (right end as viewed in the drawing). The threaded hole 25a is used to inject hydrogen storage alloy powder. A screw (not shown) is screwed to the threaded hole 25a. The screw functions as a lid of the heat exchanger 13. Heat exchanger fins 26, 27 are located between the end plates 24, 25 along the longitudinal direction of the tank main body 12. The heat exchanger fins 26, 27 contact each other to define spaces. The heat exchanger fins 26, 27 are alternately arranged at constant intervals along a direction in which the heating medium pipes 20 extend (longitudinal direction of the tank main body 12).

As viewed in the axial direction of the tank main body 12, each first heat exchanger fin 26 has the same circular shape as the end plates 24, 25. Also, each heat exchanger fin 26 is shaped as a corrugated plate having a number of bent portions 26a. Each bent portion 26a is sharp-pointed. On the other hand, as viewed in the axial direction, each second heat exchanger fin 27 has the same circular shape as the end plates 24, 25. Each second heat exchanger fin 27 is formed into a flat plate. Each associated pair of the heat exchanger fins 26, 27 contact each other at the bent portions 26a and coupled to each other by soldering. The space between each adjacent pair of the heat exchanger fins 26, 27 is divided into sections 28 by the first heat exchanger fin 26. Each section 28 has a substantially triangular cross-section. The sections 28 are arranged both along a horizontal direction and a vertical direction.

As shown in FIG. 1(b), some of the sections 28, which are defined by each first heat exchanger fin 26, are filled with powder 29 of a hydrogen storage alloy (MH). The powder 29 will hereafter be referred to as MH powder. The sections 28 that are not filled with the MH powder 29 form absorption portions 30. That is, the sections 28 include filled sections 28 that are filled with the MH powder 29, and non-filled sections 28 that are not filled with the MH powder 29. Each non-filled sections 28 functions as the absorption portion 30. Each absorption portion 30 is deformed by a force generated when the MH powder 29 is expanded along the longitudinal direction of the tank main body 12, thereby absorbing the force of the expansion. "The force generated by expansion of the hydrogen storage alloy (powder 29)" refers to a force applied to the heat exchanger fins 26, 27 and the absorption portions 30 by the hydrogen storage alloy when the alloy is expanded. When the hydrogen storage tank 11 is used, each heat exchanger fin 26, which is shaped as a corrugated plate, functions as a sediment limiting portion, which limits movement of the hydrogen storage alloy filling the tank main body 12 in the sediment direction (vertical direction). In other words, the heat exchanger fins 26, 27 include the heat exchanger fins 26 that function as the sediment limiting portion. That is, in this embodiment, the absorption portions 30 are defined by part of the sediment limiting portions.

The arrangement of the absorption portions 30 and the rate of the volume of the absorption portions 30 to that of the heat exchanger 13 are set in a consideration of the type of the hydrogen storage alloy, the loading weight of the hydrogen storage alloy, and the bulk density of the hydrogen storage alloy, which bulk density that has substantially stopped changing due to a progressed pulverization. In the construction of this embodiment, in which the space between each adjacent pair of the heat exchanger fins 26, 27 is divided into the sections 28, the absorption portions 30 are preferably arranged evenly.

Figure 3:
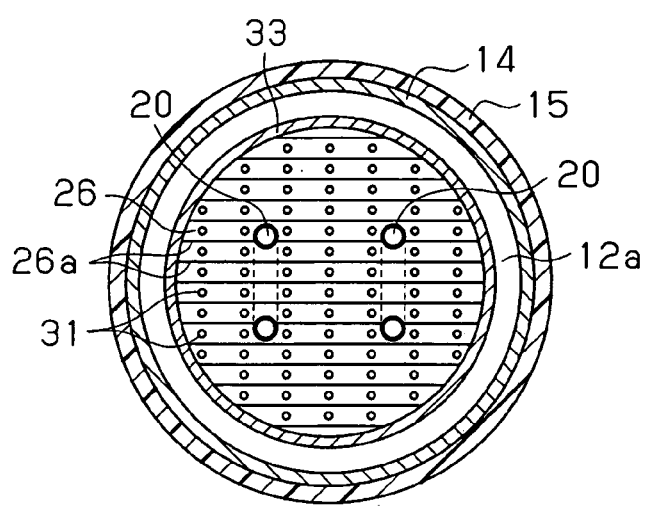
FIG. 3 is a cross-sectional view taken along line A-A of FIG. 1(a)

Each first heat exchanger fin 26 has holes 31 through which the MH powder 29 pass. As shown in FIGS. 1(b) and 3, the holes 31 are located in positions that do not correspond to the absorption portions 30. Also, each second heat exchanger fin 27 has holes 32 through which the MH powder 29 pass in position that do not correspond to the absorption portions 30. In this embodiment, the holes 31 formed in the first heat exchanger fins 26 are in positions corresponding to the positions of the holes 32 formed in the second heat exchanger fins 27. Therefore, any of the sections 28 that is filled with the MH powder 29 communicates with the adjacent section 28 that is filled with the MH powder 29. For purposes of illustration, FIG. 1(b) shows a state where the filling density is excessively low. However, when actually filling the hydrogen storage tank 11 with the MH powder 29, the filling density of the powder 29 is substantially maximized.

As shown in FIG. 1(a), a filter 33 is provided at the radial ends of the heat exchanger fins 26, 27 to cover all the heat exchanger fins 26, 27. The filter 33 does not permit the MH powder 29 to pass through and permits hydrogen to pass through. The outer diameter of the filter 33 is set such that a space exists between the outer circumferential surface of the filter 33 and the inner circumferential surface of the liner 14. The heat exchanger 13 is supported by the tank main body 12 with support members 12a. The support members 12a are located at an axial midpoint position in the longitudinal direction and the distal end (right end) of the heat exchanger 13. The support members 12a are located between the inner circumferential surface of the tank main body 12 and the outer circumferential surface of the filter 33, while contacting the inner circumferential surface of the tank main body 12 and the outer circumferential surface of the filter 33. The support members 12a are made of porous metal body having continuous pores. Each support member 12a is formed annular and contacts the filter 33 along the entire circumference.

A method for manufacturing the hydrogen storage tank 11, which is constructed as above, will hereafter be described. First, the heat exchanger 13 having the heating medium pipes 20, the end plates 24, 25, and the heat exchanger fins 26, 27 is prepared. Ends of the heating medium pipes 20 of the heat exchanger 13 are fixed to the header portion 21 by soldering or welding. Next, sealing members 34 are provided between the lid 17 and the header portion 21. In this state, the header portion 21 is fitted into the recess 22a. The header portion 21 is secured to the lid 17 with screws 35.

After attaching the heat exchanger 13 to the lid 17 with the header portion 21, the heat exchanger 13 is accommodated in the tank main body 12. In this state, the lid 17 is secured to the liner 14 with screws 36. That is, the liner 14, which is formed of separate components, is integrated. Then, the liner 14 is set in a filament winding apparatus (not shown). Through the filament winding method, carbon fibers impregnated with a thermosetting resin are wound about the circumferential surface of the liner 14. Then, the thermosetting resin is hardened to form the fiber reinforced resin layer 15.

Then, the lid 17 is arranged to be at the lower end. In this state, the tank 11 is filled with MH powder 29. During filling of the MH powder 29, a funnel-like filler jig having cylindrical portions connected to the opening 18 of the liner 14 and to the threaded holes 25a formed in the end plate 25 is used. The MH powder 29 supplied onto the first heat exchanger fins 26 from the threaded holes 25a gradually moves downward and the sections 28 on the sides through the holes 31, 32. After all the sections 28 except the absorption portions 30 are filled with the MH powder 29, the filler jig is removed. Thereafter, screws are screwed into the threaded holes 25a to complete filling the MH powder 29. Then, the valve 19 is attached to the opening 18. Accordingly, the manufacture of the hydrogen storage tank 11 is complete.

Operation of the hydrogen storage tank 11 constructed as above will be described. Specifically, a case where the hydrogen storage tank 11 is used in a fuel cell electric vehicle will be explained.

The hydrogen storage tank 11 is mounted transversely when in use. When the hydrogen storage tank 11 is in use, the passages 17a, 17b are connected to pipes through which a heating medium, which is water, supplied from the heating medium supplier, passes through. That is, the hydrogen storage tank 11 is used in a state where the valve 19 is connected to a pipe (not shown) connected to a fuel cell. The tank main body 12 is filled with high-pressure hydrogen. The pressure in the tank main body 12 is increased to increase the loading weight of hydrogen in portions of the tank main body 12 except for portions filled with the MH powder 29. For example, when the pressure in the tank main body 12 is 25 MPa, hydrogen that can be stored in the tank main body 12 is 250 times that of a case where the pressure in the tank main body 12 is equal to atmospheric pressure.

When the valve 19 is held in the hydrogen release state, if hydrogen is used at a fuel electrode of the fuel cell, hydrogen gas is released from the hydrogen storage tank 11 through the valve 19. The released hydrogen gas is supplied to the fuel electrode. When hydrogen gas is released from the hydrogen storage tank 11, reaction that occurs in the MH powder 29 is shifted to hydrogen release reaction between hydrogen storage and release reactions, which causes the MH powder 29 to release hydrogen gas. The release of hydrogen is an endothermic reaction. Therefore, if heat required for releasing hydrogen is not supplied by the heating medium, the MH powder 29 releases hydrogen by using its own sensible heat, which causes the temperature of the MH powder 29 to drop. When the temperature of the MH powder 29 drops, the rate of reaction of hydrogen releasing is lowered. However, when hydrogen is released, heated water is supplied to the passage 17a, the heating medium pipes 20, and the passage 17b. The heated water prevents the temperature of the MH powder 29 from being decreased by means of the heating medium pipes 20 and the heat exchanger fins 26, 27, which permits hydrogen release reaction to smoothly take place. Hydrogen released from the MH powder 29 is discharged to the outside of the hydrogen storage tank 11 through the valve 19 and supplied to the fuel electrode.

When filling the hydrogen storage tank 11 with hydrogen gas after the tank 11 has released hydrogen gas, that is, when causing the MH powder 29 to store hydrogen gas, the valve 19 is switched to the hydrogen storage state, and hydrogen gas is supplied to the hydrogen storage tank 11 through the valve 19. Hydrogen as supplied to the interior of the hydrogen storage tank 11 reacts with the MH powder 29. Then, the hydrogen becomes hydride and stored in the MH powder 29. Since the storage reaction of hydrogen is an exothermic reaction, the storage reaction of the hydrogen is hampered unless the heat generated by the reaction is removed. However, when filling the tank 11 with hydrogen gas, cold water is supplied to the passage 17a, the heating medium pipes 20, and the passage 17b. The cold water prevents the temperature of the MH powder 29 from being increased by means of the heating medium pipes 20 and the heat exchanger fins 26, 27, which permits storage of hydrogen to be efficiently performed.

Conditions such as temperatures and pressures during storage and release of hydrogen are determined in accordance with factors such as the composition of the MH powder 29.

After the MH powder 29 has repeated storage and release of hydrogen, the MH powder 29 is pulverized, which decreases the bulk density of the MH powder 29. When the bulk density is low, filling the tank 11 with hydrogen causes the MH powder 29 to expand and increase the force acting on the heat exchanger 13. Therefore, without the absorption portions 30, increase in the amount of MH powder 29 filling the spaces between the heat exchanger fins 26, 27 increases the expansion of the MH powder 29 in the longitudinal direction of the tank main body 12. This, in turn, may deform or damage the heat exchanger 13. If the heat exchanger 13 is deformed and damaged, the MH powder 29 leaks through the damaged section. The leaked MH powder 29 flows outside of the hydrogen storage tank 11 through the valve 19. However, since the absorption portions 30 are provided in this embodiment, the absorption portions 30 will be deformed (crushed) when the MH powder 29 is expanded by a great amount. The absorption portions 30 absorb the force due to expansion of the MH powder 29. Accordingly, the heat exchanger 13 is prevented from being deformed or damaged.

This embodiment provides the following advantages.

(1) The hydrogen storage tank 11 incorporates the heat exchanger 13. The heat exchanger 13 includes the heating medium pipes 20, through which a heating medium flows, and the heat exchanger fins 26, 27, which are coupled to the heating medium pipes 20 to divide the interior of the tank main body 12 into spaces along the longitudinal direction of the tank 11. The MH powder 29 are provided in the spaces. Also, the absorption portions 30 are provided in the spaces. The MH powder 29 is pulverized by repeated storage and release of hydrogen. Accordingly, the bulk density of the MH powder 29 is lowered. Also, the MH powder 29 is expanded when storing hydrogen. Therefore, increase in the amount of MH powder 29 filling the spaces between the heat exchanger fins 26, 27 can increase the expansion of the MH powder 29 in the longitudinal direction of the tank main body 12. This, in turn, may deform or damage the heat exchanger 13. However, in such a case, the absorption portions 30 are deformed to absorb the force due to the expansion of the MH powder 29. The heat exchanger 13 is thus prevented from being deformed or damaged.

(2) The heat exchanger 13 has the sediment limiting portion. When the hydrogen storage tank 11 is used, the sediment limiting portion (heat exchanger fins 26) limits movement of the MH powder 29 filling the tank main body 12 in the sediment direction. When storage and release of hydrogen are repeated in a state where the MH powder 29 fills the spaces between the heat exchanger fins 26, 27, the MH powder 29 is pulverized. Also, some of the MH powder 29 that is in upper sections in the tank main body 12 moves in the sediment direction, or moves downward. Then, the MH powder 29 becomes compacted in lower portions in the tank main body 12. The expansion force is increased in the portions of the compacted MH powder 29. However, in this embodiment, the sediment limiting portion is provided for limiting movement of the MH powder 29 in the sediment direction. Therefore, the MH powder 29 is prevented from being partially compacted in sections that are located in the lower part of the tank 11 when in use. This facilitates the arrangement of the absorption portions 30.

(3) The sediment limiting portion is formed by dividing the spaces between the heat exchanger fins 26, 27 into sections 28 with the heat exchanger fins 26. Therefore, the sediment limiting portion is easily formed by making at least either of the heat exchanger fins 26 and the heat exchanger fins 27 (for example, the first heat exchanger fins 26) to be non-flat (for example, corrugated). Also, compared to a case where the first heat exchanger fins 26 are flat, the heat exchanger fins 26, 27 contact the MH powder 29 at a larger area, which improves the heat exchanger effectiveness.

(4) Some of the sections 28 defined by the sediment limiting portion are not filled with the MH powder 29. These sections 28 form the absorption portions 30. Thus, when the heat exchanger 13 has the sediment limiting portions, the absorption portions 30 are easily formed. Further, since the absorption portions 30 are defined by the heat exchanger fins 26, the absorption portions 30 do not hamper heat conduction of the MH powder 29 even if the absorption portions 30 are crushed.

(5) The absorption portions 30 are configured to be crushed in a direction intersecting the sediment direction (vertical direction). In detail, the cross section of the absorption portion 30 is an isosceles triangle, the base of which corresponds to a vertical plane formed by the second heat exchanger fin 27. Thus, when expansion of the MH powder 29 applies an excessive force along the longitudinal direction of the tank main body 12 in portions other than the absorption portions 30, the force is reliably absorbed by the absorption portions 30.

(6) The sections 28 are formed by the corrugated first heat exchanger fins 26 and the flat second heat exchanger fins 27. The absorption portions 30 are formed of the sections 28 each having a triangular cross-section. Therefore, the absorption portions 30 are easily crushed in a direction intersecting the sediment direction of the MH powder 29.

(7) The liner 14 forming the tank main body 12 has the opening 16 for receiving the heat exchanger 13. The heat exchanger 13 is integrated with the lid 17. Therefore, spinning and heat treatment of the liner 14 do not need to be performed with the liner 14 fixed to the heat exchanger 13. This facilitates the manufacture of the liner 14.

(8) The support members 12a are made of porous metal bodies. At a midpoint in the longitudinal direction, the heat exchanger 13 is supported by one of the support members 12a located between the inner surface of the tank main body 12 and the outer surface of the filter 33. Therefore, compared to a case where the heat exchanger 13 is supported by the tank main body 12 with a cantilever structure, the durability against vibration of the hydrogen storage tank 11 is improved.

A second embodiment of the present invention will now be described with reference to FIG. 4. The second embodiment is different from the first embodiment in that no sediment limiting portion is provided, and absorption portions are defined by members separate from heat exchanger fins. Other basic structure of the second embodiment is the same as that of the first embodiment. Therefore, the same reference numerals are given to those components that the same as the corresponding components of the first embodiment, and the differences from the first embodiment will be described below.

Figure 4:
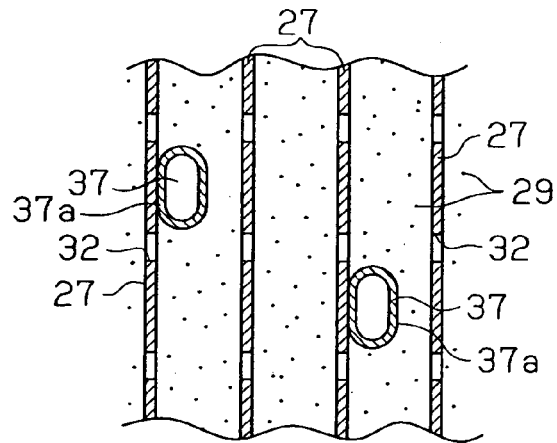
FIG. 4 is a cross-sectional view illustrating a part of a hydrogen storage tank according to a second embodiment of the present invention.

FIG. 4 is a partial cross-sectional view of a hydrogen storage tank 11 corresponding to FIG. 1(b). A heat exchanger 13 has flat heat exchanger fins 27, which are substantially spaced at constant intervals. No corrugated heat exchanger fins 26 are provided. That is, the interspace between the end plates 24, 25 are divided into a plurality of spaces (subspaces) by the heat exchanger fins 27, which are arranged at constant intervals along the longitudinal direction of the tank main body 12. Adjacent spaces are not separated so as to form a continuous interspace.

Some of the heat exchanger fins 27 have absorption portions 37. Each absorption portion 37 is deformed by a force generated when MH powder 29 is expanded along the longitudinal direction of the tank main body 12, thereby absorbing the force of the expansion. Each absorption portion 37 is defined by a pipe 37a that is made of metal (for example, aluminum) and substantially has an ellipse cross-section. Each pipe 37a is fixed to one of the heat exchanger fins 27 by soldering or welding in a state where a flat portion of the absorption portion 37 faces the corresponding heat exchanger fin 27. That is, the pipe 37a is arranged such that the major axis of the ellipse extends along the vertical direction. Each absorption portion 37 (the pipes 37a) extends horizontally when the hydrogen storage tank 11 is in use. That is, the absorption portions 37 (the pipes 37a) are formed to be easily crushed by pressure along the longitudinal direction of the hydrogen storage tank 11. The MH powder 29 fills sections in the spaces between the heat exchanger fins 27 except for the sections occupied by the absorption portions 37.

In addition to the advantages (1), (7) and (8) of the first embodiment, the second embodiment provides the following advantages.

(9) The absorption portions 30 are not defined by some of the heat exchanger fins 27, but are defined by components that are separate from the heat exchanger fins 27. Therefore, there is no need to prepare two types of the heat exchanger fins 27, or a type on which holes 32 are substantially evenly formed for permitting the MH powder 29 to pass through, and a type on which no holes 32 are formed in sections corresponding to the absorption portions 30.

(10) Each absorption portion 37 is formed to substantially have an ellipse cross-section. Each pipe 37a is fixed to one of the heat exchanger fins 27 in a state where a flat portion of the absorption portion 37 faces the corresponding heat exchanger fin 27. Therefore, the absorption portions 37 are easily crushed by pressure along the longitudinal direction of the hydrogen storage tank 11.

(11) Only the flat heat exchanger fins 27 are fixed to the heating medium pipes 20 at constant intervals. Thus, the manufacture of the heat exchanger 13 is facilitated compared to a configuration in which the corrugated heat exchanger fins 26 and the flat heat exchanger fins 27 are fixed to the heating medium pipes 20 such that the fins 26 and 27 contact each other.

The invention may be embodied in the following forms.

Figure 5:
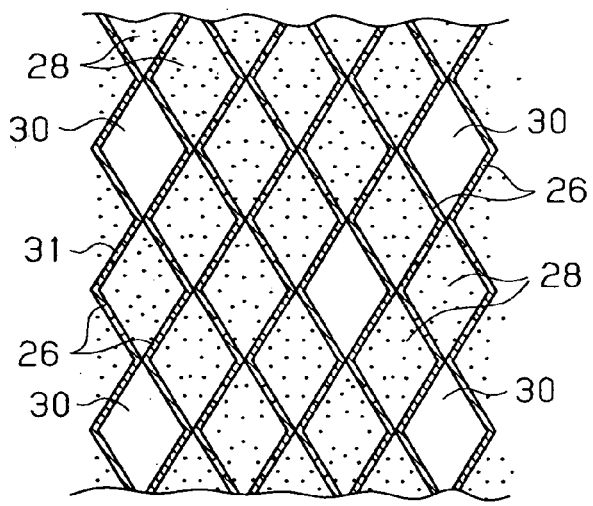
FIG. 5 is a cross-sectional view illustrating a part of a hydrogen storage tank according to another embodiment of the present invention.

In a configuration where a space between each adjacent pair of heat exchanger fins is divided into sections 28 by the heat exchanger fins 26 as in the first embodiment, only the corrugated heat exchanger fins 26 may be used as shown in FIG. 5 instead of using the corrugated heat exchanger fins 26 and the flat heat exchanger fins 27. In this case, the corrugated heat exchanger fins 26 contact each other. That is, each adjacent pair of the heat exchanger fins 26 are arranged to face away from each other. The sediment limiting portions are formed with a single type of the heat exchanger fins 26, which also define the absorption portions 30.

Figure 6:
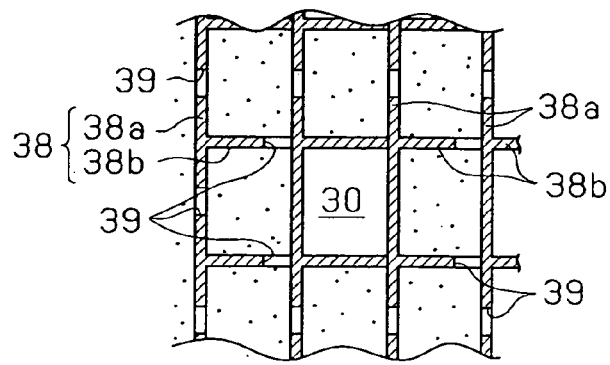
FIG. 6 is a cross-sectional view illustrating a part of a hydrogen storage tank according to yet another embodiment of the present invention.

In a configuration where a space between each adjacent pair of heat exchanger fins is divided into sections 28 by the heat exchanger fins 26 as in the first embodiment, heat exchanger fins 38 as shown in FIG. 6 may be used. Each heat exchanger fin 38 includes a flat portion 38a and projections 38b formed on one side of the flat portion 38a. In this case, the heat exchanger fins 38 include portions (projections 38b) that function as the sediment limiting portions. In this configuration, holes 39 for permitting the MH powder 29 pass through are formed in the flat portion 38a at positions that do not correspond to the sections 28 defining the absorption portions 30. Also, the holes 39 are formed in the projections 38b that do not correspond to the sections 28 defining the absorption portions 30.

In a configuration where a space between each adjacent pair of heat exchanger fins is divided into sections 28 by the heat exchanger fins as in the first and other embodiments, instead of providing the absorption portions 30 in some of the sections by omitting the holes 31, 32 that permit the MH powder 29 to pass through, the holes 31, 32 may be formed in all the sections 28 without forming the absorption portions 30. Pipes 37a that define absorption portions 37 may be provided in some of the sections 28. In this case, two or more types of heat exchanger fins 26, 27, 38 having different arrangement of holes 31, 32 do not need to be provided.

In a configuration where only the absorption portions 37 are provided in a space between each adjacent pair of the heat exchanger fins 27 without providing the sediment limiting portions as in the second embodiment, the number of the absorption portions 37 located in a lower portion of the hydrogen storage tank 11 in use may be greater than the number of the other absorption portions 37. When providing no sediment limiting portions, the MH powder 29 becomes compacted in a lower portion of the hydrogen storage tank 11 in use, which can increase the force due to expansion of the MH powder 29 when hydrogen is stored. However, since the ratio of the absorption portions 37 located in the lower portion is great, the force is smoothly absorbed. The heat exchanger 13 is thus prevented from being deformed or damaged.

In a configuration where only the absorption portions 37 are provided in a space between each adjacent pair of the heat exchanger fins 27 without providing the sediment limiting portions as in the second embodiment, members (pipes 37a) for defining the absorption portions 37 do not need to be formed of metal, but may be formed, for example, of resin. However, since resin has a lower thermal conductivity compared to metal, the pipes 37a made of metal have a better thermal conductivity between the MH powder 29 and the heat exchanger fins 27.

The absorption portions 37 do not need to be formed by the pipes 37a, but may be any members that have a space that can be crushed by pressure.

The absorption portions 37 may be defined by a material that is contracted by pressure, such as rubber.

In a configuration where heat exchanger fins do not form sediment limiting portions as in the second embodiment, corrugated heat exchanger fins 26 may be used instead of flat heat exchanger fins 27. In this case, compared to a case where the flat heat exchanger fins 27 are used, the heat exchanger fins 26 contact the MH powder 29 at a larger area, which improves the heat exchanger effectiveness. Other than the corrugated heat exchanger fins, heat exchanger fins having recesses or bent into shapes other than the corrugated shape will improve the heat exchanger effectiveness compared to the case of the flat heat exchanger fins 27.

In a configuration where a space between each adjacent pair of heat exchanger fins is divided into sections 28 by the heat exchanger fins 26 as in the first and other embodiments, the holes 31, 32 may be formed in all the sections 28. In this case, the holes 31, 32 corresponding to the sections 28 defining the absorption portions 30 may be blocked so that the MH powder 29 does not enter the sections 28 forming the absorption portions 30.

As long as the heat exchanger 13 includes the heating medium pipes 20, through which a heating medium flows, and the heat exchanger fins 26, 27, 38 which are coupled to the heating medium pipes 20 to divide the interior of the tank main body 12 into spaces along the longitudinal direction of the tank 11, the heating medium pipes 20 do not need to be U-shaped. For example, the heating medium pipes 20 may be a pair of linear pipes. In this case, the left ends (proximal ends) of the pipes are fixed to the header portion 21, and the right ends (distal ends) are connected to a block member having a passage.

The liner 14 does not need to have separate components like the lid 17. For example, after the heat exchanger 13 is attached to the proximal end of the liner 14, the distal end of the liner 14 may be tapered through spinning.

The shapes of the heat exchanger fins 26, 27 do not need to be substantially circular as viewed in the axial direction. For example, the shapes of the heat exchanger fins 26, 27 may be polygonal such as square or hexagonal.

The heat exchanger 13 does not need to be fixed to the lid 17 with the header portion 21. However, the heat exchanger 13 may be configured such that ends of the heating medium pipes 20 are fixed to the lid 17.

The number of the heating medium pipes 20 of the heat exchanger 13 is not limited to two. However, the number of the heating medium pipes 20 may be one, three, four, or more.

The heating medium is not limited to water. However, fluid other than water may be used to control the temperature in the tank 11.

The distal end and the mid point portion of the heat exchanger 13 do not need to be supported by the support members 12a. However, only the proximal end of the heat exchanger 13 may be supported.

The hydrogen storage tank 11 does not need to be used as a hydrogen source of a fuel cell electric automobile, but may be used as a hydrogen source of a hydrogen engine or a heat pump. The hydrogen storage tank 11 may be used as a hydrogen source for a home fuel cell.

The reinforcing fibers of the fiber-reinforced resin are not limited to carbon fibers, but may be fibers known to have high elasticity and strength, such as glass fibers, ceramic fibers of silicon carbide, and aramid fibers.

The material for the liner 14 is not limited to aluminum, but may be a metal that has a sealing property and a specific gravity similar to that of the aluminum. Alternatively, the liner 14 may be made of a synthetic resin such as a polyamide and a high-density polyethylene.

The tank main body 12 of the hydrogen storage tank 11 does not need to have a layered structure of the liner 14 and the fiber reinforced resin layer 15, but may be entirely made of metal. However, the configuration in which the outer portion of the liner 14 is covered with the fiber reinforced resin reduces the weight by a greater degree.

In the illustrated embodiments, to increase the capacity of the hydrogen storage of the hydrogen storage tank 11, hydrogen is stored in the hydrogen storage tank 11 in a high pressure. However, the storage pressure does not need to be high, but may be atmospheric pressure as long as the hermeticity is maintained.

The present examples and embodiments are to be considered as illustrative and not restrictive and the invention is not to be limited to the details given herein, but may be modified within the scope and equivalence of the appended claims.

The invention claimed is:

1. A hydrogen storage tank comprising:
a tank main body;
a hydrogen storage alloy accommodated in the tank main body, wherein the hydrogen storage alloy expands when storing hydrogen; and
a heat exchanger accommodated in the tank main body, wherein the heat exchanger includes:
a heating medium pipe, through which a heating medium flows;
a plurality of heat exchanger fins coupled to the heating medium pipe to divide the interior of the tank main body into a plurality of spaces, the hydrogen storage alloy is provided in the spaces; and
an absorption portion provided in the spaces, wherein the absorption portion is deformed by a force generated by expansion of the hydrogen storage alloy, thereby absorbing the force.

2. The tank according to claim 1, wherein the heat exchanger further includes:
a sediment limiting portion that limits sediment of the hydrogen storage alloy.

3. The tank according to claim 2, wherein the sediment limiting portion divides each of the spaces into a plurality of sections.

4. The tank according to claim 3, wherein the sections include filled sections that are filled with the hydrogen storage alloy, and non-filled sections that are not filled with the hydrogen storage alloy, the non-filled sections functioning as the absorption portion.

5. The tank according to claim 3, wherein the heat exchanger fins include a heat exchanger fin that functions as the sediment limiting portion.

6. The tank according to claim 3, wherein the heat exchanger fins include a portion that functions as the sediment limiting portion.

7. The tank according to claim 2, wherein the heat exchanger fins include:
   a plurality of non-flat first heat exchanger fins; and
   a plurality of flat second heat exchanger fins that are arranged such that each adjacent pair of the second heat exchanger fins face each other, wherein each of the first heat exchanger fins is provided between an adjacent pair of the second heat exchanger fins, wherein the first heat exchanger fins function as the sediment limiting portion.

8. The tank according to claim 7, wherein the first heat exchanger fins are corrugated fins.

9. The tank according to claim 8, wherein the cross section of the absorption portion is an isosceles triangle, the base of which corresponds to a vertical plane formed by one of the second heat exchanger fins.

10. The tank according to claim 2,
    wherein the heat exchanger fins are corrugated fins, and
    wherein each adjacent pair of the heat exchanger fins are arranged to face away from each other.

11. The tank according to claim 2,
    wherein each heat exchanger fin includes a flat portion and a plurality of projections formed on the flat portion, wherein the projections contact the flat portion of the adjacent heat exchanger fin.

12. The tank according to claim 1, wherein the absorption portion is formed to be crushed along a direction intersecting a vertical direction by the force.

13. The tank according to claim 1, wherein each heat exchanger fin includes a portion that corresponds to the absorption portion and a portion that does not correspond to the absorption portion, wherein the non-corresponding portion has a hole that permits the hydrogen storage alloy to pass through.

14. The tank according to claim 1, wherein the absorption portion is formed of a metal pipe.

15. The tank according to claim 14, wherein the cross section of the pipe is substantially an ellipse, and wherein the pipe is arranged such that the major axis of the ellipse extends along the vertical direction.

16. The tank according to claim 1, wherein the tank main body includes:
    a hollow liner having an end portion including an opening and a lid closing the opening; and
    a fiber reinforced resin layer covering the outer surface of the liner.

* * * * *

UNITED STATES PATENT AND TRADEMARK OFFICE
CERTIFICATE OF CORRECTION

| | |
|---|---|
| PATENT NO. | : 7,326,281 B2 |
| APPLICATION NO. | : 11/064620 |
| DATED | : February 5, 2008 |
| INVENTOR(S) | : Fujita et al. |

It is certified that error appears in the above-identified patent and that said Letters Patent is hereby corrected as shown below:

Column 1, line 35, please delete "adversely affects" and insert therefore -- adversely affect --.

Column 1, line 61, please delete "heat exchanger fins not" and insert therefore -- the heat exchanger fins do not --.

Column 2, lines 6-7, please delete "have the limits in terms of prevention" and insert therefore -- have limits in terms of the prevention --.

Column 2, line 24, please delete "hydrogen into" and insert therefore -- hydrogen in --.

Column 2, line 60, please delete "sections functioning" and insert therefore -- sections functions --.

Column 4, line 60, please delete "coupled to" and insert therefore -- are coupled to --.

Column 5, line 7, please delete "sections 28" and insert therefore -- section 28 --.

Column 5, lines 36 and 39-40, please delete "powder 29 pass." and insert therefore -- powder 29 passes. --.

Column 6, line 1, please delete "made of porous" and insert therefore -- made of a porous --.

Column 6, line 34, please delete "and the sections" and insert therefore -- and to the sections --.

Column 8, line 2, please delete "powder 29 are provided" and insert therefore -- powder 29 is provided --.

Column 8, line 56, please delete "cross section" and insert therefore -- cross-section --.

Column 9, line 25, please delete "that the" and insert therefore -- that are the --.

Column 10, line 40, please delete "pass through" and insert therefore -- to pass through --.

Column 12, line 27, please delete "tank 11 in a high" and insert therefore -- tank 11 at a high --.

UNITED STATES PATENT AND TRADEMARK OFFICE
CERTIFICATE OF CORRECTION

PATENT NO.         : 7,326,281 B2
APPLICATION NO.    : 11/064620
DATED              : February 5, 2008
INVENTOR(S)        : Fujita et al.

It is certified that error appears in the above-identified patent and that said Letters Patent is hereby corrected as shown below:

IN THE CLAIMS

In Claim 9 at column 13, lines 21-22, please delete "cross section" and insert therefore -- cross-section --.

In Claim 15 at column 14, lines 17-18, please delete "cross section" and insert therefore -- cross-section --.

Signed and Sealed this

Fourth Day of November, 2008

JON W. DUDAS
*Director of the United States Patent and Trademark Office*